Feb. 13, 1962        D. E. LUPFER        3,020,975

SAMPLING SYSTEM FOR A PROCESS ANALYZER

Filed Oct. 17, 1957        2 Sheets-Sheet 1

INVENTOR.
D. E. LUPFER

BY Hudson & Young

ATTORNEYS.

Feb. 13, 1962 D. E. LUPFER 3,020,975
SAMPLING SYSTEM FOR A PROCESS ANALYZER
Filed Oct. 17, 1957 2 Sheets-Sheet 2

INVENTOR.
D. E. LUPFER
BY Hudson & Young
ATTORNEYS.

United States Patent Office 3,020,975
Patented Feb. 13, 1962

3,020,975
SAMPLING SYSTEM FOR A PROCESS ANALYZER
Dale E. Lupfer, Bartlesville, Okla., assignor to Phillips
Petroleum Company, a corporation of Delaware
Filed Oct. 17, 1957, Ser. No. 690,815
4 Claims. (Cl. 183—32)

This invention relates to the preparation of liquid streams removed from a chemical process for subsequent analysis by vaporization and removal of solid and slurry materials.

In order to provide continuous sample streams for process monitors and control instruments, such as mass spectrometers, infrared analyzers, refractometers, or other analysis instruments, it is generally necessary to remove solid and slurry materials which may be present in the stream. This cannot always be accomplished by standard filtering methods because large amounts of solid or slurry materials build up and cause rapid plugging of conventional filters. Furthermore, fine particle size materials cannot always be filtered out of fluid streams. Examples of streams which contain solid or slurry materials include alkylation process streams which carry aluminum chloride sludge, phosphoric acid streams found in the manufacture of triple superphosphate which carry calcium sulfate sludge, and catalytic cracking effluent streams which carry catalyst dust. Generally speaking, the amount of sample required for continuous process monitor and control instruments is quite small in comparison with the volume of the sample stream available for analysis.

It has recently been discovered that solid and slurry materials can advantageously be separated from liquid and vapor streams by the use of a cyclone separator. A relatively large volume of the sample stream is directed into the cyclone separator which is operated so that a large portion of the inlet stream is removed through the bottom of the separator. The solid materials are centrifugally separated and removed through the bottom outlet along with the main body of the sample stream. A relatively small volume stream that is substantially free from solids is withdrawn from the top of the separator. In normal operation, approximately 90 to 98 percent of the inlet stream is removed from the bottom of the separator. This provides good separation because of the centrifugal forces developed. Since most analyzers require a sample in the vapor phase, the sample stream withdrawn from the top of the separator must be vaporized, if it is not already a vapor, before being directed to the analyzer.

In accordance with the present invention, apparatus is provided to vaporize liquid sample streams at constant temperatures and pressures. The liquid is introduced into a vaporization chamber and flows therethrough in a spiral path. A heat exchange fluid at a constant temperature is circulated on both sides of the spiral path to maintain the chamber at a constant temperature. A part of the resulting vapor is subsequently passed to an analyzer at a constant pressure. Liquid, any entrained solids and the remainder of the vapor are removed from the vaporization chamber through a novel pressure regulator which maintains a desired operating pressure in the chamber.

Accordingly, it is an object of this invention to provide an improved system for supplying sample streams to analysis instruments.

Another object is to provide a sample stream preparation system which incorporates means to vaporize a liquid stream at a constant temperature and pressure.

A further object is to provide apparatus for maintaining constant pressure in vessels containing fluids.

Other objects, advantages, and features of this invention should become apparent from the following detailed description which is taken in conjunction with the accompanying drawing in which.

Figure 1:
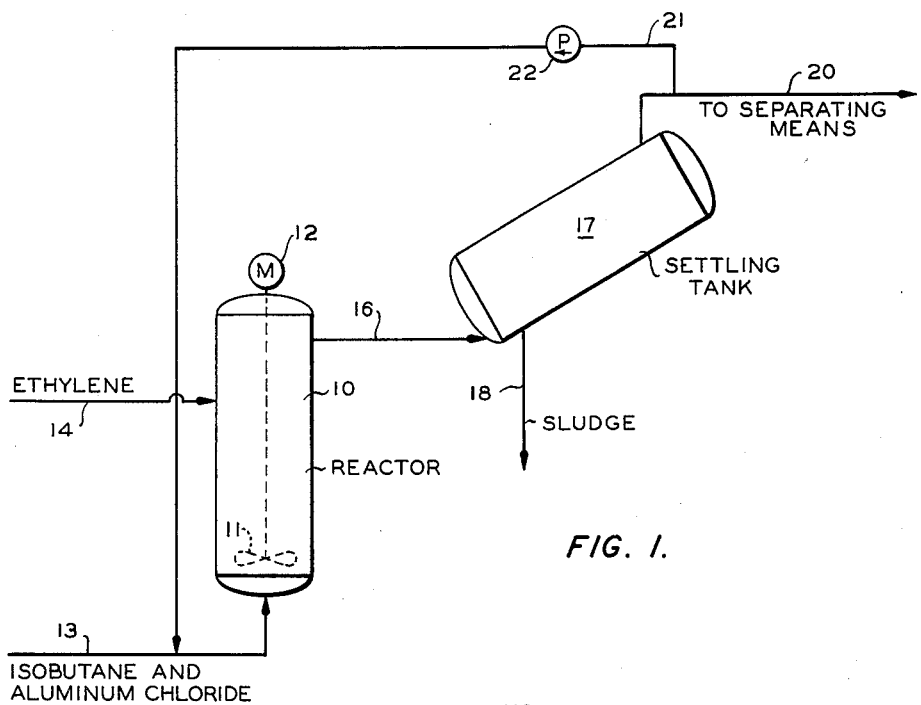
FIGURE 1 is a schematic representation of an alkylation unit to which the sampling system of this invention is particularly applicable.

Referring now to the drawing in detail and to FIGURE 1 in particular, there is shown a reactor 10 for an alkylation process. This reactor is provided with a stirrer 11 which is rotated by a motor 12. A first feed stream, which can be a mixture of isobutane and aluminum chloride catalyst, is supplied to the bottom of reactor 10 by means of a conduit 13. A second feed stream, which can be ethylene, is supplied to reactor 10 through a conduit 14. The reaction product is removed from reactor 10 through a conduit 16 which communicates with a settling tank 17. Sludge is withdrawn from bottom of tank 17 through a conduit 18 and can be recycled back to reactor 10, if desired. An overhead stream, containing the alkylate product and unreacted isobutane, is withdrawn from tank 17 through a conduit 20 which communicates with suitable separating means, not shown. A portion of the overhead stream from settling tank 17 is recycled back to reactor 10 through a conduit 21 which has a pump 22 therein. It is desired to analyze a sample of this stream to determine the completeness of the reaction. This can readily be accomplished by measuring the ethylene concentration in the stream directed through conduit 21. Such an analysis can be made by means of an infrared analyzer, for example.

Figure 2:
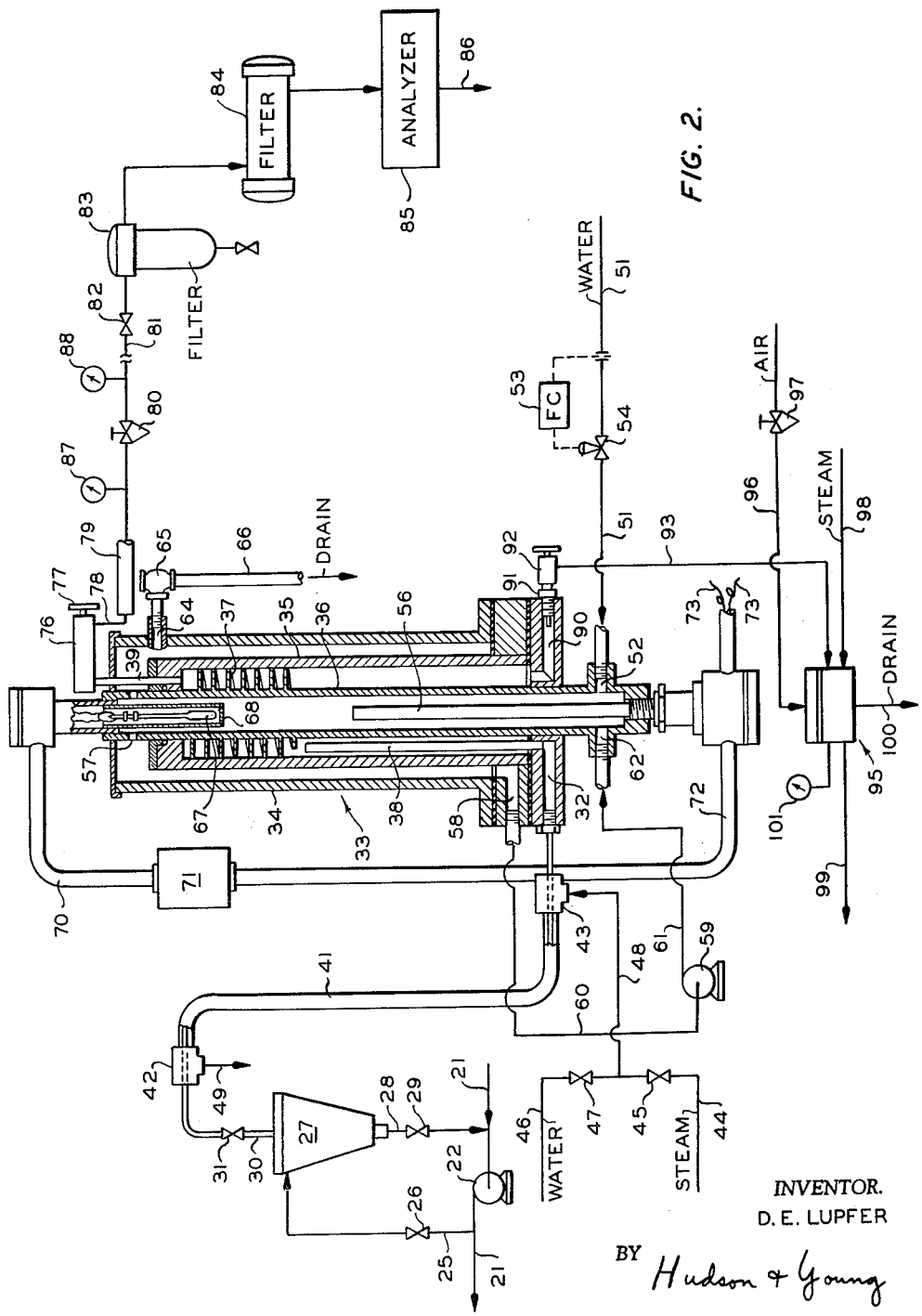
FIGURE 2 is a schematic view of a present preferred embodiment of the sampling system of this invention.

The stream circulated through conduit 21 normally contains some aluminum chloride sludge which must be removed before the stream is passed to the analyzer. A present preferred embodiment of the sample stream preparation system of this invention is illustrated schematically in FIGURE 2. A conduit 25, which has a valve 26 therein, communicates between conduit 21 downstream from pump 22 and the inlet of a cyclone separator 27. The bottom opening of separator 27 is connected by means of a conduit 28, which has a valve 29 therein, with conduit 21 upstream from pump 22. The pressure differential across pump 22 thus results in a flow of fluid through conduit 25, separator 27, and conduit 28. Cyclone separators are well known in the art and for this reason separator 27 is not described in detail herein. Separator 27 includes an inlet port in the upper side wall which introduces the inlet stream tangential to the inner wall. The resulting centrifugal force serves to separate entrained solids which fall to the bottom of the separator and are removed through conduit 28. A stream having a large part of the solids removed therefrom is directed from the top of separator 27 through a conduit 30, the lower end of which extends down into separator 27 to a point below the fluid inlet port. The relative sizes of conduits 28 and 30 are selected so that approximately 90 to 98 per cent of the fluid introduced into separator 27 is removed through bottom conduit 28. This results in a sample stream relatively free of solids being removed through conduit 30.

Conduit 30, which has a valve 31 therein, communicates between cyclone separator 27 and the first inlet port 32 of a liquid vaporizing assembly 33. Assembly 33 comprises three concentric hollow cylinders 34, 35, and 36. Inner cylinder 36 is provided with a spiral fin 37 of heat conductive material which extends outwardly to cylinder 35. The sample which enters assembly 33 through inlet port 32 passes upwardly through a tube 38 which is disposed between cylinders 36 and 35. This sample flows in a helical path past fin 37 and is removed through an outlet port 39.

Conduit 30 is surrounded by a hollow conduit 41 through which water at an elevated temperature is circulated to maintain the sample flowing through conduit 30 at a desired elevated temperature. The ends of conduit 41 terminate in respective T's 42 and 43 through which conduit 30 extends. Steam is introduced into the system through a conduit 44 which has a control valve 45 therein, and water is introduced into the system through a conduit 46 which has a control valve 47 therein. Conduits 44 and 46 communicate with a common conduit 48 which in turn communicates with T 43. The temperature of the water flowing through conduit 48 can be regulated by adjusting valves 45 and/or 47 to vary the relative amounts of steam and water which are combined. The resulting water flows through conduit 41 and is removed through a conduit 49 which communicates with T 42.

Water is introduced into assembly 33 through a conduit 51 which communicates with a port 52 in the lower region of cylinder 36. The flow through conduit 51 is maintained at a predetermined rate by means of a flow controller 53 which adjusts a control valve 54. This water flows upwardly through cylider 36 past an electrical heating element 56 which is disposed in the lower region of cylinder 36. The upper end of conduit 36 is provided with passages 57 to direct the water into the region between cylinders 35 and 34. Water is removed from this region through a port 58 which communicates with the inlet of a pump 59 through a conduit 60. The outlet of pump 59 is connected by a conduit 61 to a second inlet port 62 in the lower region of cylinder 36 adjacent port 52. Pump 59 thus recycles the water back into cylinder 36. Cylinder 34 has an outlet port 64 in the upper region thereof which communicates with a T 65. The upper port of T 65 is open to atmosphere, and the lower port is connected to an overflow drain conduit 66. A portion of the circulating water is thus removed continuously from the assembly.

A temperature sensing device 67 is disposed in a well 68 in the upper region of cylinder 36 to provide a signal representative of the temperature of the water circulated through cylinder 36. Electrical leads from device 67 extend through a conduit 70 to a switch box 71 which contains a relay. This relay is connected by electrical leads which extend through a conduit 72 to heating element 56 and to power leads 73 which extend to a source of current, not shown. The temperature sensing device controls the application of current to heating element 56 in a conventional manner so that sufficient heat is imparted to the water to maintain a desired temperature in the region of well 68.

Vapor outlet port 39 communicates through a conduit 76, which has a thermometer 77 therein, to a conduit 78. Conduit 78, which has a layer of insulation 79 thereon, communicates with the inlet of a pressure regulator 80. The outlet of pressure regulator 80 is connected by means of a conduit 81 through a valve 82 and filters 83 and 84 to the inlet of an analyzer 85. The vapor is subsequently removed from analyzer 85 through a conduit 86. Pressure gages 87 and 88 are provided in respective conduits 78 and 81. Filter 83 can be of the cartridge type, and filter 84 comprises a fibrous material such as glass wool. Vapor is thus passed from assembly 33 at a constant pressure to the inlet of analyzer 85, which can advantageously be an infrared analyzer in the analysis system described herein.

It is important that the pressure within assembly 33 be maintained constant. This insures that only the desired constituents of the sample vaporize at the constant temperature maintained within the assembly. To maintain this constant pressure, an outlet port 90 communicates with the lower region of the assembly between cylinders 35 and 36. Port 90 is connected through a conduit 91, which has a thermometer 92 therein, to a conduit 93 which communicates with a back-pressure regulator 95. Air is supplied to pressure regulator 95 at a constant pressure by means of a conduit 96 which has a pressure controller 97 therein. Steam is introduced into the pressure regulator through a conduit 98 and is removed through a conduit 99. Non-vaporized liquid, any solids which are present in the sample directed to the assembly through conduit 30, and a part of the vapor are removed from pressure regulator 95 through a conduit 100. A pressure gage 101 provides an indication of the pressure within regulator 95.

Figure 3:
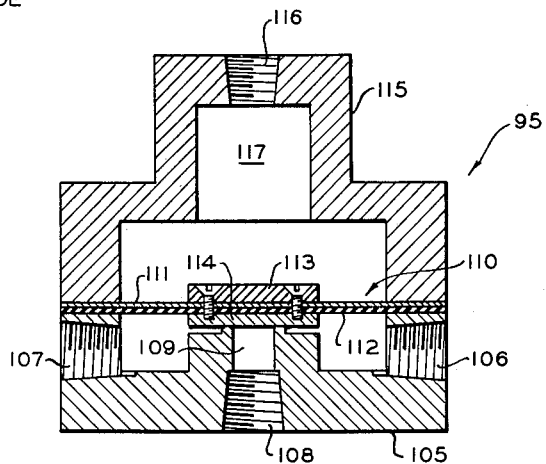
FIGURE 3 is a detailed view of the drain pressure regulator of FIGURE 2.

Pressure regulator 95 is illustrated in detail in FIGURE 3. This pressure regulator comprises a base 105 having four inlet ports in the side thereof, two of which are illustrated at 106 and 107. These four ports communicate with respective conduits 93, 98, 99 and pressure gauge 101. A port 108 is formed in base 105 to communicate with drain conduit 100 of FIGURE 2. Port 108 is connected by a passage 109 which extends upwardly to form a valve seat. A diaphragm 110, which preferably is formed of a metal sheet 111 and a rubber sheet 112, extends across the top of base 105. This diaphragm is provided with backing plates 113 and 114, the latter forming a valve head across the top of passage 109. A cover 115 is attached to base 105 by suitable screws, not shown. Cover 115 is provided with a port 116 which communicates with air conduit 96 of FIGURE 2.

A predetermined air pressure is thus maintained in chamber 117 of the pressure regulator by means of pressure controller 97. This pressure tends to force diaphragm 110 downwardly so that plate 114 blocks passage 109. The pressure of the vapor between cylinders 35 and 36 of assembly 33 exerts an upward pressure on diaphragm 110 which tends to move plate 114 away from passage 109. Whenever the force exerted by the vapor exceeds the force exerted by the pressure in chamber 117, fluid is vented through passage 109. This permits a preselected pressure to be maintained within assembly 33.

The pressure regulator of FIGURE 3 operates more effectively than previous pressure regulators which have employed springs to force the diaphragm downwardly to block the outlet passage. Accumulations of sludge on the valve seat in the previous devices have resulted in compression of the spring to change the force exerted thereby. The operating pressure in the assembly of FIGURE 3 is controlled entirely by the pressure within chamber 117 and is not influenced in any manner by accumulations of sludge on the valve seat.

The fluid sample normally enters assembly 33 at a temperature slightly lower than the temperature within the assembly. This preheating of the sample stream precludes the possibility of the assembly being upset by vaporizing a cold sample therein. The aluminum chloride sludge and most of the heavier hydrocarbons do not vaporize appreciably at the temperature and pressure within assembly 33. Most of the ethylene does vaporize, however, so that a change in ethylene content in the original sample is reflected by a proportional change in the ethylene content of the final sample stream which is removed from assembly 33.

In one specific embodiment of this invention, the pressure downstream from pump 22 was maintained at approximately 400 pounds per square inch gage. The pressure at the inlet of pump 22 was maintained at approximately 370 pounds per square inch gage. The temperature of the stream directed through pump 22 was in the general range of 120 to 140° F. This stream had a composition approximately as follows:

| Component: | Mol percent |
|---|---|
| Methane | 1.66 |
| Ethylene | 0.94 |
| Ethane | 5.18 |
| Propane | 2.69 |
| Isobutane | 62.30 |
| Normal butane | 4.15 |
| Pentane and heavier | 23.08 |

Aluminum chloride was present in a concentration of approximately 680 parts per million. Conduits 25 and 28 had internal diameters of approximately ¼ inch. Conduit 30 comprised approximately 8 feet of 1/32 inch internal diameter pipe in series with approximately 48 feet of 1/16 inch internal diameter pipe between separator 27 and port 32. These small diameter pipes provided the desired pressure drop and avoided plugging in the line, which would result if conventional regulator was used to drop the pressure. Conduit 41 comprised ⅜ inch internal diameter pipe. Conduit 21 was an eight inch line. Assembly 33 was operated at a temperature of approximately 100° F. and at a pressure of approximately 30 pounds per square inch gage. The sample supplied to analyzer 85 through conduit 81 was maintained at a pressure of approximately 7 pounds per square inch gage by means of controller 80 in order to prevent condensate from forming in this line. The sample flow to analyzer 85 was at a rate of 1000 to 1500 cc. per minute.

An infrared analyzer can be employed to advantage to measure the ethylene concentration in the sample stream. Such analyzers are well known in the art and for this reason analyzer 85 is not described in detail herein. However, the analyzer can be any other suitable instrument which is capable of measuring the concentration of ethylene. A mass spectrometer can be employed to make this measurement, for example.

From the foregoing description it should be evident that this invention provides an improved sample system for a fluid analyzer. The cyclone separator provides a means for obtaining continuously a substantially solids-free sample stream. The vaporizer assembly provides a final vapor stream at a preselected pressure and which is entirely free of entrained solids. An efficient heat exchange arrangement is incorporated in the vaporizer assembly.

While this invention has been described in conjunction with a present preferred embodiment, it should be evident that it is not limited thereto.

What is claimed is:

1. Apparatus for vaporizing liquid samples comprising a first hollow cylinder having a spiral fin mounted thereon; a second hollow cylinder enclosing said first cylinder; a third hollow cylinder enclosing said second cylinder; means to introduce a liquid to be vaporized into the region between said first and second cylinders adjacent one end of said fin; means to remove vapor from the region between said first and second cylinders adjacent the second end of said fin; means to maintain a predetermined pressure in the region between said first and second cylinders comprising a housing, a diaphragm dividing the interior of said housing into first and second chambers, means forming a valve seat in said first chamber which is adapted to be closed by said diaphragm, means to apply a predetermined fluid pressure to said second chamber to urge said diaphragm toward said valve seat, conduit means communicating between the region between said first and second cylinders and said first chamber, and means forming an outlet passage in said housing which communicates with said first chamber through said valve seat when said diaphragm is moved off said valve seat by the pressure of fluid in the region between said first and second cylinders; and means to circulate a heating medium through said first cylinder and the region between said second and third cylinders to supply heat to vaporize liquid in the region between said first and second cylinders.

2. The apparatus of claim 1 further comprising heating means secured to said housing to maintain said housing at an elevated temperature.

3. The apparatus of claim 1 wherein said means to circulate a heating medium comprises a heating element positioned within said first cylinder, a temperature detecting element positioned within said first cylinder, means to introduce a liquid into an opening in said first cylinder so as to flow past said heating element and said temperature detecting element, means forming a passage between the interiors of said first and third cylinders to transfer the liquid into the region between said second and third cylinders, a drain conduit communicating with said third cylinder to remove excess liquid, means to return liquid from the region between said second and third cylinders to the interior of said first cylinder through said opening, and means responsive to said detecting element to regulate said heating element to maintain a constant temperature adjacent said detecting element.

4. Apparatus for continuously preparing samples of material for analysis comprising a cyclone separator having an inlet port adapted to continuously receive a sample of material and an outlet port in the upper region thereof through which a substantially solids-free sample can be removed, a first hollow cylinder having a spiral fin externally mounted thereon, a second hollow cylinder enclosing said first cylinder and said fin, a third hollow cylinder enclosing said second cylinder, heated conduit means communicating between said outlet port and the region between said first and second cylinders adjacent one end of said fin to continuously supply vapor to said region between said first and second cylinders, means to continuously remove vapor from the region between said first and second cylinders adjacent the second end of said fin, means to maintain a predetermined pressure in the region between said first and second cylinders, and means to circulate a heating medium through said first cylinder and the region between said second and third cylinders to supply heat to vaporize liquid in the region between said first and second cylinders, said means to maintain a predetermined pressure in the region between said first and second cylinders comprising a housing, a diaphragm dividing the interior of said housing into first and second chambers, means forming a valve seat in said first chamber which is adapted to be closed by said diaphragm, means to apply a predetermined fluid pressure to said second chamber to urge said diaphragm toward said valve seat, conduit means communicating between the region between said first and second cylinders and said first chamber, and means forming an outlet passage in said housing which communicates with said first chamber through said valve seat when said diaphragm is moved off said valve seat by the pressure of fluid in the region between said first and second cylinders.

References Cited in the file of this patent

UNITED STATES PATENTS

| 893,377 | Rosemeyer | July 14, 1908 |
| 1,894,459 | Brady | Jan. 17, 1933 |
| 2,016,746 | Ireland | Oct. 8, 1935 |
| 2,145,084 | Hersey | Jan. 24, 1939 |
| 2,272,341 | Holzapfel | Feb. 10, 1942 |
| 2,272,381 | Marvin | Feb. 10, 1942 |
| 2,483,275 | Gregor | Sept. 27, 1949 |
| 2,519,333 | Annin | Aug. 22, 1950 |
| 2,557,536 | Drane et al. | June 19, 1951 |